US012801120B2

(12) United States Patent
Humphrey et al.

(10) Patent No.: US 12,801,120 B2
(45) Date of Patent: Nov. 17, 2026

(54) SYSTEMS AND METHODS FOR AUTOMATICALLY ADAPTING A FAN CURVE FOR A COMPUTING DEVICE

(71) Applicant: LENOVO (SINGAPORE) PTE. LTD, New Tech Park (SG)

(72) Inventors: Grason Humphrey, Morrisville, NC (US); Russell Speight VanBlon, Raleigh, NC (US)

(73) Assignee: LENOVO (SINGAPORE) PTE. LTD, Singapore (SG)

( * ) Notice: Subject to any disclaimer, the term of this patent is extended or adjusted under 35 U.S.C. 154(b) by 596 days.

(21) Appl. No.: 18/187,702

(22) Filed: Mar. 22, 2023

(65) Prior Publication Data

US 2024/0319711 A1 Sep. 26, 2024

(51) Int. Cl.
*G05B 19/4155* (2006.01)

(52) U.S. Cl.
CPC .................... *G05B 19/4155* (2013.01); *G05B 2219/49216* (2013.01)

(58) Field of Classification Search
None
See application file for complete search history.

(56) References Cited

U.S. PATENT DOCUMENTS

| | | | | |
|---|---|---|---|---|
| 2017/0303438 | A1* | 10/2017 | Shabbir | H05K 7/20209 |
| 2017/0339491 | A1* | 11/2017 | Kim | G06F 3/165 |
| 2020/0323102 | A1* | 10/2020 | Artman | H05K 7/20172 |
| 2021/0068302 | A1* | 3/2021 | North | G06F 9/5055 |
| 2022/0147128 | A1* | 5/2022 | Stevens | F04D 29/663 |
| 2022/0404882 | A1* | 12/2022 | Wanjale | F04D 27/004 |

* cited by examiner

*Primary Examiner* — David Earl Ogg
(74) *Attorney, Agent, or Firm* — Carroll, Hoette & Butscher, LLC; Joseph M. Butscher

(57) ABSTRACT

A system and a method include a control unit configured to control one or more fans of a computing device based on one or more fan curves. The control unit is configured to automatically adapt the one or more fan curves based on one or both of a current use of the computing device or one or more aspects of an environment in which the computing device is located.

20 Claims, 2 Drawing Sheets

SYSTEMS AND METHODS FOR AUTOMATICALLY ADAPTING A FAN CURVE FOR A COMPUTING DEVICE

BACKGROUND

Examples of the present disclosure generally relate to systems and methods for automatically adapting a fan curve for a computing device.

Computing devices can be used to operate various applications, such as word processing, video games, slide show presentations, email, internet, calendars, audio and/or video livestreams, audio and/or video recordings, and/or the like. Known computing devices include one or more fans that are configured to cool various components. The fan(s) operate according to fan curves.

A fan curve is a graph regarding performance. The fan curve can include a temperature axis, a fan speed axis, and an operational plot (such as a line, curve, and/or the like) in relation to the temperature axis and the fan speed axis. For example, as a temperature of one or more components of a computing device increases, a speed of the fan increases to provide increased cooling. The fan curve dictates how the fan operates in relation to temperature and fan speed.

A fan of a computing device generates noise. In general, fan noise is directly proportional to fan speed. Thus, noise typically increases as the speed of the fan increases. Noise generated by the fan can be annoying to individuals for various reasons, such as when reading, concentrating on a particular task, listening to music, sleeping, trying to relax, and/or the like.

An individual can manually select a fan curve via BIOS, for example. However, the fan curve remains active until the individual selects another fan curve. In practice, individuals typically select a fan curve that works well under heavy load (such as during gaming), which can generate significant fan noise. However, the fan curve remains active even after the particular use is finished, which can lead to the generated fan noise being a nuisance to the individual and/or others within an environment (such as a room) of the computing device.

SUMMARY

A need exists for a system and a method for adapting one or more fan curves based on use of a computing device and/or an environment in which the computing device is located. Further, a need exists for a system and a method for efficiently and effectively controlling a speed of a fan.

With those needs in mind, certain examples of the present disclosure provide a system including a control unit configured to control one or more fans of a computing device based on one or more fan curves. The control unit is configured to automatically adapt the one or more fan curves based on one or both of a current use of the computing device or one or more aspects of an environment in which the computing device is located.

The control unit can be separate and distinct from the computing device. As another example, the computing device includes the control unit.

In at least one example, one more sensors are in communication with the control unit. The one or more sensors are configured to detect one or both of the current use of the computing device or the one or more aspects of the environment. The one or more sensors can include one or more of a smart device, a camera, a headset, a microphone, a speaker, a thermometer, or the control unit.

In at least one example, the control unit is configured to automatically adapt the one or more fan curves by automatically switching between different fan curves. In at least one example, the control unit is configured to automatically adapt the one or more fan curves by automatically modifying one fan curve.

In at least one example, the control unit is configured to automatically adapt the one or more fan curves based on both the current use of the computing device and the one or more aspects of the environment in which the computing device is located.

In at least one example, the control unit is an artificial intelligence or machine learning system.

Certain examples of the present disclosure provide a method including controlling, by a control unit, one or more fans of a computing device based on one or more fan curves. Said controlling includes automatically adapting the one or more fan curves based on one or both of a current use of the computing device or one or more aspects of an environment in which the computing device is located.

Certain examples of the present disclosure provide a non-transitory computer-readable storage medium comprising executable instructions that, in response to execution, cause one or more control units comprising a processor, to perform operations including controlling one or more fans of a computing device based on one or more fan curves. Said controlling includes automatically adapting the one or more fan curves based on one or both of a current use of the computing device or one or more aspects of an environment in which the computing device is located.

DETAILED DESCRIPTION

It will be readily understood that the components of the embodiments as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments as claimed, but is merely representative of example embodiments.

Reference throughout this specification to "one embodiment," or "an embodiment" (or the like) means that a particular feature, structure, or characteristic described in connection with the embodiment is included in at least one embodiment. Thus, appearances of the phrases "in one embodiment," "in an embodiment" or the like in various places throughout this specification are not necessarily all referring to the same embodiment.

Further, the described features, structures or characteristics may be combined in any suitable manner in one or more embodiments. In the following description, numerous specific details are provided to give a thorough understanding of the various embodiments. One skilled in the relevant art will recognize, however, that the various embodiments can be practiced without one or more of the specific details, or with other methods, components, materials, etc. In other instances, well-known structures, materials, or operations are not shown or described in detail to avoid obfuscation. The following description is intended only by way of example, and simply illustrates certain example embodiments.

Examples of the present disclosure provide systems and methods that are configured to dynamically adapt one or more fan curves based on use of a computing device, detected environmental changes, and/or the like.

Figure 1:
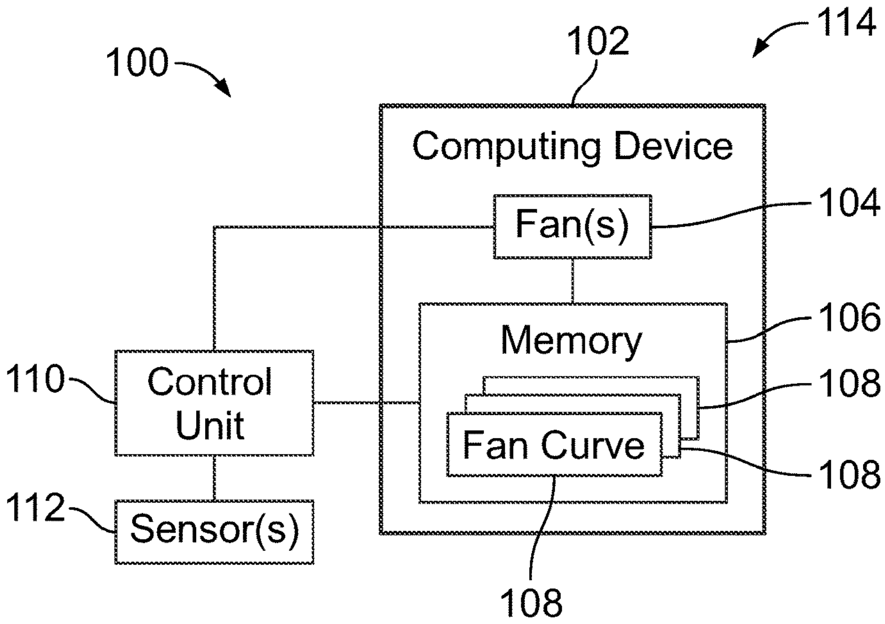
FIG. 1 illustrates a schematic block diagram of a system, according to an example of the present disclosure.

FIG. 1 illustrates a schematic block diagram of a system 100, according to an example of the present disclosure. The system 100 includes a computing device 102 having one or more fans 104 configured to operate to cool one or more components of the computing device 102. In at least one example, the computing device 102 is a personal computer or computer workstation. As another example, the computing device 102 is a laptop computer. As another example, the computing device 102 is a server. The aforementioned examples of computing devices are non-limiting. The computing device 102 can be any type of computer system having one or more fans 104 that are configured to cool one or more components thereof.

The computing device 102 further includes a memory 106 that stores one or more fan curves 108 that dictate operation of the fan(s) 104. Numerous fan curves 108 can be stored in memory. Each of the fan curves 108 can be associated with a particular operational use of the computing device 102. For example, a first fan curve 108 can be associated with a gaming application, a second fan curve 108 can be associated with a word processing application, a third fan curve 108 can be associated with a teleconferencing application, a fourth fan curve 108 can be associated with a music playing application, and/or the like.

A control unit 110 is in communication with the fan(s) 104 and the memory 106, such as through one or more wired or wireless connections. The control unit 110 can be remote from the computing device 102. In at least one example, the control unit 110 can be separated from the computing device 102, but within the same environment 114, such as a room in which the computing device 102 is located. As another example, the control unit 110 can be at a location that is remote from the environment 114. As another example, the control unit 110 can be part of the computing device 102. That is, the computing device 102 can include the control unit 110. The control unit 110 is configured to control the fan(s) 104 based on the fan curve(s) 108 stored in the memory 106.

The control unit 110 is also in communication with one or more sensors 112, such as through one or more wired or wireless connections. The sensors 112 can be remote from the computing device 102. The sensors 112 can be disposed within the environment 114. The sensors 112 can also be in communication with the computing device 102, such as through one or more wired or wireless connections. In at least one example, at least one sensor 112 can be part of the computing device 102. That is, the computing device 102 can include one or more sensors 112. The sensors 112 can include one or more of a smart device (such as a handheld smart phone or smart tablet), a camera, a headset, a microphone, a speaker, a thermometer, and/or the like. In at least one example, the control unit 110 can be a sensor 112.

In operation, the sensor(s) 112 is configured to detect one or both of a current use of the computing device 102, and/or one or more aspects of the environment 114. For example, the sensor(s) 112 is configured to detect a current use of the computing device 102, such as through detecting and/or recognizing a program that is running on the computing device 102. As another example, the sensor(s) 112 is configured to detect a temperature of one or more components of the computing device 102. As another example, the sensor(s) 112 is configured to detect an aspect of the environment, such as a temperature within the environment 114 in which the computing device 102 is located. As another example, the sensor(s) 112 is configured to detect an aspect of the environment 114, such as one or more locations and/or one or more actions of one or more individuals within the environment 114.

The control unit 110 receives signals output by the sensor(s) 112 indicative of one or both of the current use of the computing device 102, and/or the one or more aspects of the environment 114. In response to receiving the signals output by the sensor(s) 112, the control unit 110 automatically adapts, without human intervention, one or more fan curves 108 to control the one or more fans 104. In at least one example the control unit 110 automatically adapts the one or more fan curves 108 by automatically switching between different fan curves 108 based on the current use of the computing device 102 and/or one or more aspects of the environment 114. As another example, the control unit 110 automatically adapts the one or more fan curves 108 by automatically modifying a fan curve 108 based on the current use of the computing device 102 and/or one or more aspects of the environment 114.

As described herein, the system 100 includes the control unit 110, which is configured to control one or more fans 104 of the computing device 102 based on one or more fan curves 108. The control unit 110 is configured to automatically adapt the one or more fan curves 108 based on one or both of a current use of the computing device 102 or one or more aspects of the environment 114 (such as a room) in which the computing device 102 is located.

Figure 2:
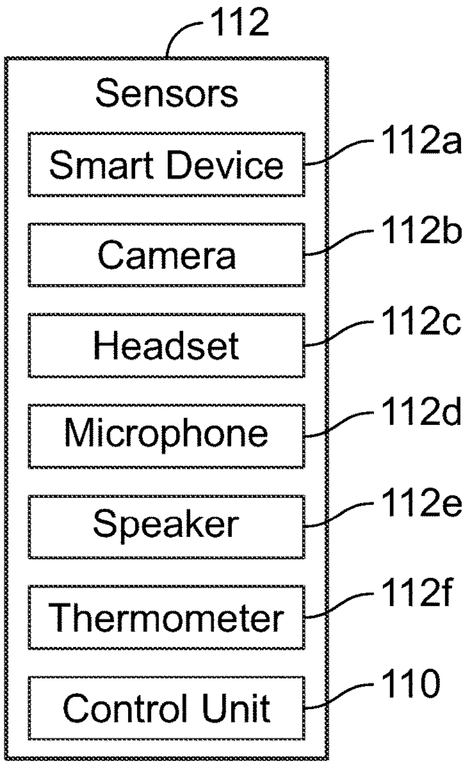
FIG. 2 illustrates a block diagram of sensors, according to an example of the present disclosure.

FIG. 2 illustrates a block diagram of sensors 112, according to an example of the present disclosure. FIG. 2 shows various examples of sensors 112, but does not show an exhaustive list of sensors 112. The sensors 112 can be or include various other examples not shown. The sensors 112 are configured to detect a current use of the computing device 102 (shown in FIG. 1), and/or one or more aspects of the environment 114 (shown in FIG. 1) in which the computing device 102 is located.

Referring to FIGS. 1 and 2, the sensor(s) 112 can include a smart device 112*a*, such as a smart phone, smart tablet, or the like. The smart device 112*a* can include a camera, speaker, microphone, and/or the like that can detect one or more aspects of the environment 114, such as locations and movement of individuals within the environment, a display screen of the computing device 102 (such as showing one or more current uses), sounds emitted by the computing device 102, and/or individuals within the environment 114, and/or the like.

The sensor(s) 112 can include a camera 112*b*, such as disposed within the environment 114. For example, the camera 112*b* can be mounted on a wall or ceiling of the environment. As another example, the camera 112*b* can be part of the smart device 112*a*. The camera 112*b* is configured to detect one or more aspects of the environment 114, such as locations and movement of individuals within the environment, a display screen of the computing device 102 (such as showing one or more current uses), and/or the like.

The sensor(s) 112 can include a headset 112*c*, such as configured to be worn by an individual within the environment 114. The headset 112*c* can be used during particular applications of the computing device 102, such as gaming, conference calls, and/or the like. When the headset 112*c* is in use, the control unit 110 is configured to determine that a particular application is in use, and can automatically adapt the one or more fan curves 108 accordingly.

The sensor(s) 112 can include a microphone 112*d*, such as can detect audio signals. The microphone 112*d* can be separate and distinct from the computing device 102. As another example, the microphone 112*d* can be part of the computing device 102. As another example, the microphone 112*d* can be part of the smart device 112*a*. The microphone 112*d* is configured to detect audio signals that can be recognized by the control unit 110 as being associated with a particular use of the computing device 102, and/or one or more aspects within the environment 114.

The sensor(s) 112 can include a speaker 112*e*, such as can output audio signals (such as music). The speaker 112*e* can be separate and distinct from the computing device 102. As another example, the speaker 112*e* can be part of the computing device 102. As another example, the speaker 112*e* can be part of the smart device 112*a*. The speaker 112*e* is configured to output audio signals that can be recognized by the control unit 110 as being associated with a particular use of the computing device 102, and/or one or more aspects within the environment 114.

The sensor(s) 112 can include a thermometer 112*f*, such as can detect a temperature of one or more components of the computing device 102, a temperature within the environment 114, and/or the like The thermometer 112*f* can be separate and distinct from the computing device 102. As another example, the thermometer 112*f* can be part of the computing device 102. As another example, the thermometer 112*f* can be part of the smart device 112*a*. The thermometer 112*f* is configured to output temperature signals (indicative of a temperature of one or more components of the computing device 102, a temperature within the environment 114, and/or the like) that can be recognized by the control unit 110 as being associated with a particular use of the computing device 102, and/or one or more aspects within the environment 114.

In at least one example, the sensor(s) 112 can include the control unit 110 itself. The control unit 110 can monitor operation of the computing device 102, such as by monitoring one or more programs being run on the computing device, to determine a current use of the computing device 102.

In at least one example, a plurality of the sensors 112 shown in FIG. 2 can be used. For example, all of the sensors 112 shown in FIG. 2 can be in communication with the control unit 110. As another example, less than all of the sensors 112 shown in FIG. 2 can be in communication with the control unit 110. As another example, only one of the sensors 112 shown in FIG. 2 can be in communication with the control unit 110.

Figure 3:
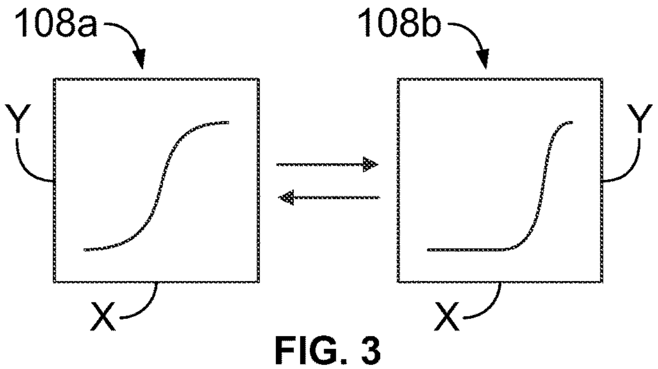
FIG. 3 illustrates a simplified representation of a first fan curve and a second fan curve, according to an example of the present disclosure.

FIG. 3 illustrates a simplified representation of a first fan curve 108*a* and a second fan curve 108*b*, which differs from the first fan curve 108*a*, according to an example of the present disclosure. The fan curves 108*a* and 108*b* include a temperature axis x and a fan speed axis y. Referring to FIGS. 1 and 3, in at least one example, the control unit 110 automatically switches (without human intervention) between the first fan curve 108*a* and the second fan curve 108*b* based on a current use of the computing device 102 and/or one or more aspects of the environment 114.

Figure 4:
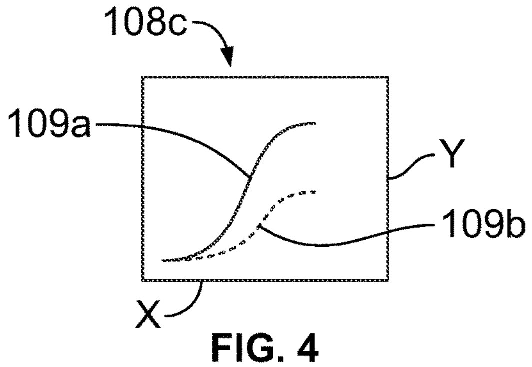
FIG. 4 illustrates a simplified representation of a fan curve, according to an example of the present disclosure.

FIG. 4 illustrates a simplified representation of a fan curve 108*c*, according to an example of the present disclosure. Referring to FIGS. 1 and 4, in at least one example, the control unit 110 automatically modifies (without human intervention) the fan curve 108*c* between different configurations 109*a* and 109*b* based on a current use of the computing device 102 and/or one or more aspects of the environment 114.

Referring to FIGS. 1-4, the fan curves 108 can be predetermined and stored in the memory 106. For example, a particular application of the computing device 102 can be associated with a particular fan curve 108, which is stored in memory 106. As another example, the control unit 110 can automatically determine and generate the fan curves 108 based on machine learning and/or artificial intelligence, for example. As another example, an individual can preconfigure the fan curves 108 and store them in the memory 106.

Figure 5:
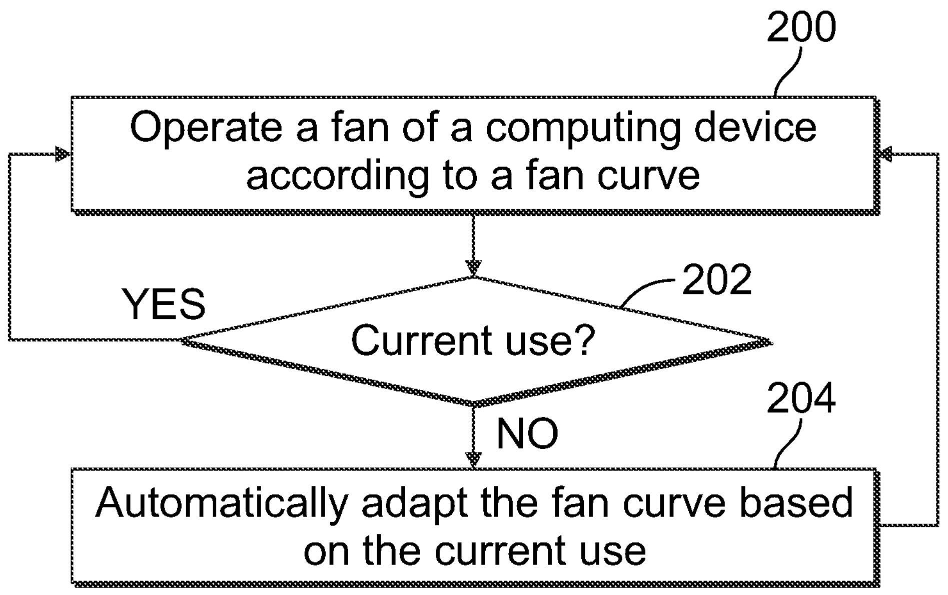
FIG. 5 illustrates a flow chart of a method, according to an example of the present disclosure.

FIG. 5 illustrates a flow chart of a method, according to an example of the present disclosure. Referring to FIGS. 1-5, at 200, the fan(s) 104 of the computing device 102 is operated according to a fan curve 108. At 202, the control unit 110 determines if the fan curve 108 is associated with a current use (such as a particular application, running program, and/or the like) of the computing device 102. The current use is detected by the one or more sensors 112 in communication with the control unit 110. If the fan curve 108 is associated with the current use, the method returns to 200. If, however, the fan curve 108 is not associated with the current use, the method proceeds from 202 to 204, at which the control unit 110 automatically adapts the fan curve 108 (such as by modifying the fan curve 108 or switching to a different fan curve 108), based on the current use as detected by the one or more sensors 112, so that the fan curve 108 is associated with the current use. The method then returns to 200.

Figure 6:
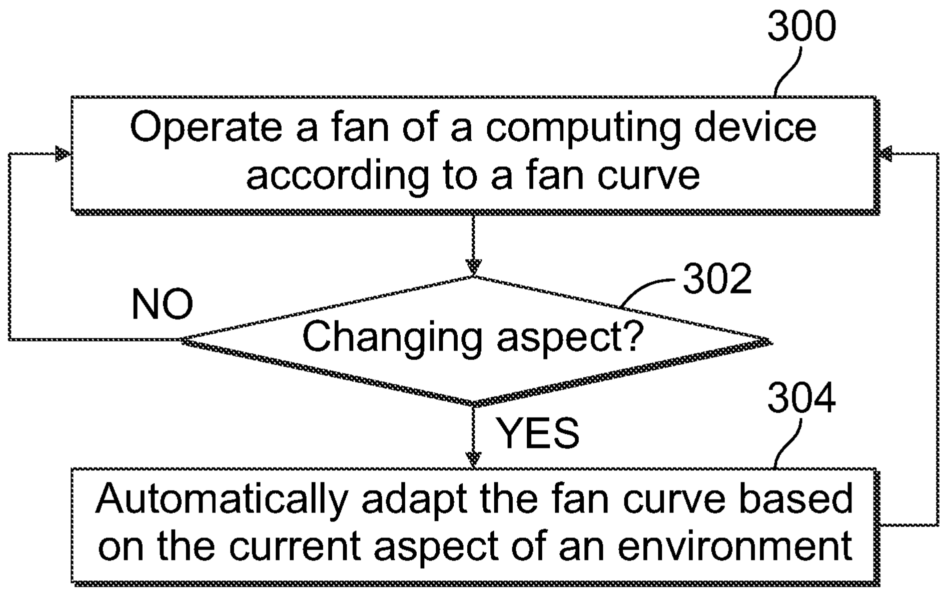
FIG. 6 illustrates a flow chart of a method, according to an example of the present disclosure.

FIG. 6 illustrates a flow chart of a method, according to an example of the present disclosure. Referring to FIGS. 1-4, and 6, at 300, the fan(s) 104 of the computing device 102 is operated according to a fan curve 108. At 302, the control unit 110 determines if one or more aspects within the environment 114 have changed such that the fan curve 108 should be changed. The aspect(s) is detected by the one or more sensors 112 in communication with the control unit 110. The aspect(s) can include location(s), movement(s), and/or state(s) (such as sleeping, actively moving, or the like) of individual(s) within the environment 114, sounds within the environment 114, images and/or videos within the environment 114, a temperature within the environment 114, and/or the like. If the aspect(s) have not changed at 302, the method returns to 300. If, however, the aspect(s) have changed to a predetermined level that is associated with a different fan curve 108, the method proceeds from 302 to 304, at which the control unit 110 automatically adapts the fan curve 108 (such as by modifying the fan curve 108 or switching to a different fan curve 108), based on the changed aspect as detected by the one or more sensors 112, so that the fan curve 108 is associated with the current aspect. The method then returns to 300.

Referring to FIGS. 1-6, in at least one example, the method can include adapting the fan curve(s) 108 based on both the current use of the computing device 102 and one or more aspects of the environment 114.

As described herein, examples of the present disclosure provide systems and methods that adapt one or more fan curves based on activity of one or more individuals (such as those using the computing device 102, and/or others within the environment 114 of the computing device 102), which can be determined by camera image recognition, wearable electronics, scheduling software, or various other inputs. The control unit 110 can prioritize adaptation of the fan curves 108 based on a hierarchical priority of individuals, such that an actual use of the computing device 102 by a first individual takes priority over one or more individuals within the environment 114 who are not actually using the computing device 102 (for example, another individual sleeping within the environment 114).

As an example, if the sensor(s) 112 detect that an individual within the environment 114 is sleeping or reading, the control unit 110 can modify the fan curve(s) 108 to ensure that fan noise is reduced. The control unit 110 can modify the fan curve(s) 108 to allow for a slightly higher temperature (such as within 10 degrees of a predefined temperature) within the computing device 102 to prioritize quietness for the nearby individual, so long as the temperatures within the computing device 102 do not exceed a predetermined threshold.

As another example, when an individual using the computing device 102 is working remote, noise over time can be annoying. The control unit 110 can analyze noise signals as detected by the sensor(s) 112, as well as open applications running on the computing device (for example, email, calendars, web conference, and/or the like) to determine work hours. Calendar events and/or time-based checks can also be used to determine work hours. If a predefined amount of work hours are expected, the control unit 110 can automatically adjust the fan curve(s) 108 accordingly.

As another example, if an individual wears headphones (or other nearby users), noise is less of an issue, and the control unit 110 can automatically adjust fan curves accordingly, such as by increasing fan speed.

As another example, if an individual is temporarily operating the computing device 102 in a high-load work application (for example, compiling code, video editing, photoshop, and/or the like), the control unit 110 can automatically adapt the one or more fan curve(s) 108 to allow more noise for a short time. If a typically high-load activity continues for a predetermined time threshold, the control unit 110 can automatically adapt the fan curve(s) 108 to adjust to noise-sensitive, as opposed to speed optimized.

As used herein, the term "control unit," "central processing unit," "CPU," "computer," or the like may include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, the control unit 110 may be or include one or more processors that are configured to control operation, as described herein.

The control unit 110 is configured to execute a set of instructions that are stored in one or more data storage units or elements (such as one or more memories), in order to process data. For example, the control unit 110 may include or be coupled to one or more memories. The data storage units may also store data or other information as desired or needed. The data storage units may be in the form of an information source or a physical memory element within a processing machine.

The set of instructions may include various commands that instruct the control unit 110 as a processing machine to perform specific operations such as the methods and processes of the various embodiments of the subject matter described herein. The set of instructions may be in the form of a software program. The software may be in various forms such as system software or application software. Further, the software may be in the form of a collection of separate programs, a program subset within a larger program, or a portion of a program. The software may also include modular programming in the form of object-oriented programming. The processing of input data by the processing machine may be in response to user commands, or in response to results of previous processing, or in response to a request made by another processing machine.

The diagrams of embodiments herein may illustrate one or more control or processing units, such as the control unit 110. It is to be understood that the processing or control units may represent circuits, circuitry, or portions thereof that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the control unit 110 may represent processing circuitry such as one or more of a field programmable gate array (FPGA), application specific integrated circuit (ASIC), microprocessor(s), and/or the like. The circuits in various embodiments may be configured to execute one or more algorithms to perform functions described herein. The one or more algorithms may include aspects of embodiments disclosed herein, whether or not expressly identified in a flowchart or a method.

As used herein, the terms "software" and "firmware" are interchangeable, and include any computer program stored in a data storage unit (for example, one or more memories) for execution by a computer, including RAM memory, ROM memory, EPROM memory, EEPROM memory, and non-volatile RAM (NVRAM) memory. The above data storage unit types are exemplary only, and are thus not limiting as to the types of memory usable for storage of a computer program.

In at least one example, all or part of the systems and methods described herein may be or otherwise include an artificial intelligence (AI) or machine-learning system that can automatically perform the operations of the methods also described herein. For example, the control unit 110 can be an artificial intelligence or machine learning system. These types of systems may be trained from outside information and/or self-trained to repeatedly adapt the fan curve (s) 108, generate new fan curves 108, and/or modify existing fan curves 108. The control unit 110 can automatically adapt, generate, and/or modify the fan curve(s) via artificial intelligence and/or machine learning. Over time, these systems can improve by matching records with increasing accuracy and speed, thereby significantly reducing the likelihood of any potential errors. The AI or machine-learning systems described herein may include technologies enabled by adaptive predictive power and that exhibit at least some degree of autonomous learning to automate and/or enhance pattern detection (for example, recognizing irregularities or regularities in data), customization (for example, generating or modifying rules to optimize record matching), or the like.

The systems may be trained and re-trained using feedback from one or more prior analyses of samples and/or data. Based on this feedback, the systems may be trained by adjusting one or more parameters, weights, rules, criteria, or the like, used in the analysis of the same or other samples. This process can be performed using generated data instead of training data, and may be repeated many times to repeatedly improve the correlation of commands. The training of the record matching system minimizes false positives and/or false negatives by performing an iterative training algorithm, in which the systems are retrained with an updated set of data and based on the feedback examined prior to the most recent training of the systems. This provides a robust analysis model that can better adapt, generate, modify fan curves 108, and the like.

Further, the disclosure comprises embodiments according to the following clauses:

Clause 1: A system comprising:

a control unit configured to control one or more fans of a computing device based on one or more fan curves, wherein the control unit is configured to automatically adapt the one or more fan curves based on one or both of a current use of the computing device or one or more aspects of an environment in which the computing device is located.

Clause 2. The system of Clause 1, wherein the control unit is separate and distinct from the computing device.

Clause 3. The system of Clause 1, wherein the computing device includes the control unit.

Clause 4. The system of any of Clauses 1-3, further comprising one or more sensors in communication with the control unit, wherein the one or more sensors are configured to detect one or both of the current use of the computing device or the one or more aspects of the environment.

Clause 5. The system of Clause 4, wherein the one or more sensors comprise one or more of a smart device, a camera, a headset, a microphone, a speaker, a thermometer, or the control unit.

Clause 6. The system of any of Clauses 1-5, wherein the control unit is configured to automatically adapt the one or more fan curves by automatically switching between different fan curves.

Clause 7. The system of any of Clauses 1-6, wherein the control unit is configured to automatically adapt the one or more fan curves by automatically modifying one fan curve.

Clause 8. The system of any of Clauses 1-7, wherein the control unit is configured to automatically adapt the one or more fan curves based on both the current use of the computing device and the one or more aspects of the environment in which the computing device is located.

Clause 9. The system of any of Clauses 1-9, wherein the control unit is an artificial intelligence or machine learning system.

Clause 10. A method comprising:

controlling, by a control unit, one or more fans of a computing device based on one or more fan curves, wherein said controlling comprises automatically adapting the one or more fan curves based on one or both of a current use of the computing device or one or more aspects of an environment in which the computing device is located.

Clause 11. The method of Clause 10, wherein the control unit is separate and distinct from the computing device.

Clause 12. The method of Clause 10, wherein the computing device includes the control unit.

Clause 13. The method of any of Clauses 10-12, further comprising detecting, by one or more sensors in communication with the control unit, one or both of the current use of the computing device or the one or more aspects of the environment.

Clause 14. The method of Clause 13, wherein the one or more sensors comprise one or more of a smart device, a camera, a headset, a microphone, a speaker, a thermometer, or the control unit.

Clause 15. The method of any of Clauses 10-14, wherein said automatically adapting comprises automatically switching between different fan curves.

Clause 16. The method of any of Clauses 10-15, wherein said automatically adapting comprises automatically modifying one fan curve.

Clause 17. The method of any of Clauses 10-16, wherein said automatically adapting comprises automatically adapting the one or more fan curves based on both the current use of the computing device and the one or more aspects of the environment in which the computing device is located.

Clause 18. The method of any of Clauses 10-17, wherein the control unit is an artificial intelligence or machine learning system.

Clause 19. A non-transitory computer-readable storage medium comprising executable instructions that, in response to execution, cause one or more control units comprising a processor, to perform operations comprising:

controlling one or more fans of a computing device based on one or more fan curves, wherein said controlling comprises automatically adapting the one or more fan curves based on one or both of a current use of the computing device or one or more aspects of an environment in which the computing device is located.

Clause 20. The non-transitory computer-readable storage medium of Clause 19, wherein said automatically adapting comprises automatically adapting the one or more fan curves based on both the current use of the computing device and the one or more aspects of the environment in which the computing device is located.

As described herein, examples of the present disclosure provide systems and methods for adapting one or more fan curves based on use of a computing device and/or one or more aspects of an environment in which the computing device is located. Further, examples of the present disclosure provide systems and methods for efficiently and effectively controlling a speed of a fan.

While various spatial and directional terms, such as top, bottom, lower, mid, lateral, horizontal, vertical, front and the like can be used to describe embodiments of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof)

can be used in combination with each other. In addition, many modifications can be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A system comprising:

a control unit configured to control one or more fans of a computing device based on one or more fan curves, wherein the control unit is configured to automatically adapt the one or more fan curves based on a use of the computing device and one or more aspects of an environment in which the computing device is located; and one or more sensors in communication with the control unit, wherein the one or more sensors are configured to detect the use of the computing device, wherein the one or more sensors comprise a camera configured to detect a program running on the computing device as shown on a display screen of the computing device.

2. The system of claim 1, wherein the control unit is separate and distinct from the computing device.

3. The system of claim 1, wherein the computing device includes the control unit.

4. The system of claim 1, wherein the control unit is configured to automatically adapt the one or more fan curves by automatically switching between different fan curves.

5. The system of claim 1, wherein the control unit is configured to automatically adapt the one or more fan curves by automatically modifying one fan curve.

6. The system of claim 1, wherein the control unit is an artificial intelligence or machine learning system.

7. The system of claim 1, wherein the camera is disposed within the environment and further configured to detect a location of an individual within the environment, and the movement of the individual within the environment.

8. The system of claim 1, wherein the one or more sensors further comprise a microphone configured to detect audio signals recognized by the control unit as being associated with the use of the computing device or the one or more aspects within the environment.

9. The system of claim 1, further comprising a speaker configured to output audio signals recognized by the control unit as being associated with the use of the computing device or the one or more aspects within the environment.

10. The system of claim 1, further comprising a speaker configured to output audio signals recognized by the control unit as being associated with the use of the computing device or the one or more aspects within the environment, and wherein the one or more sensors further comprise:

a microphone configured to detect audio signals recognized by the control unit as being associated with the use of the computing device or the one or more aspects within the environment; and a thermometer configured to detect a temperature of one or more components of the computing device.

11. A method comprising:

controlling, by a control unit, one or more fans of a computing device based on one or more fan curves, wherein said controlling comprises automatically adapting the one or more fan curves based on a use of the computing device and one or more aspects of an environment in which the computing device is located; and detecting, by one or more sensors in communication with the control unit, the use of the computing device, wherein the one or more sensors comprise a camera that detects a program running on the computing device as shown on a display screen of the computing device.

12. The method of claim 11, wherein the control unit is separate and distinct from the computing device.

13. The method of claim 11, wherein the computing device includes the control unit.

14. The method of claim 11, wherein said automatically adapting comprises automatically switching between different fan curves.

15. The method of claim 11, wherein said automatically adapting comprises automatically modifying one fan curve.

16. The method of claim 11, wherein the control unit is an artificial intelligence or machine learning system.

17. The method of claim 11, wherein the camera is disposed within the environment, and wherein said detecting comprises detecting a location of an individual within the environment, and the movement of the individual within the environment.

18. The method of claim 11, wherein the one or more sensors further comprise a microphone, and wherein said detecting comprises detecting, by the microphone, audio signals recognized by the control unit as being associated with the use of the computing device or the one or more aspects within the environment.

19. The method of claim 11, wherein said detecting comprises outputting, by a speaker, audio signals recognized by the control unit as being associated with the use of the computing device or the one or more aspects within the environment.

20. A non-transitory computer-readable storage medium comprising executable instructions that, in response to execution, cause one or more control units comprising a processor, to perform operations comprising:

controlling one or more fans of a computing device based on one or more fan curves, wherein said controlling comprises automatically adapting the one or more fan curves based on a use of the computing device and one or more aspects of an environment in which the computing device is located as detected by one or more sensors in communication with the control unit, wherein the one or more sensors comprise a camera configured to detect a program running on the computing device as shown on a display screen of the computing device.

* * * * *